July 7, 1931.  F. R. BACHLER  1,813,268
PROCESS OF MAKING LEGUMINOUS FLAKES
Filed Aug. 1, 1927
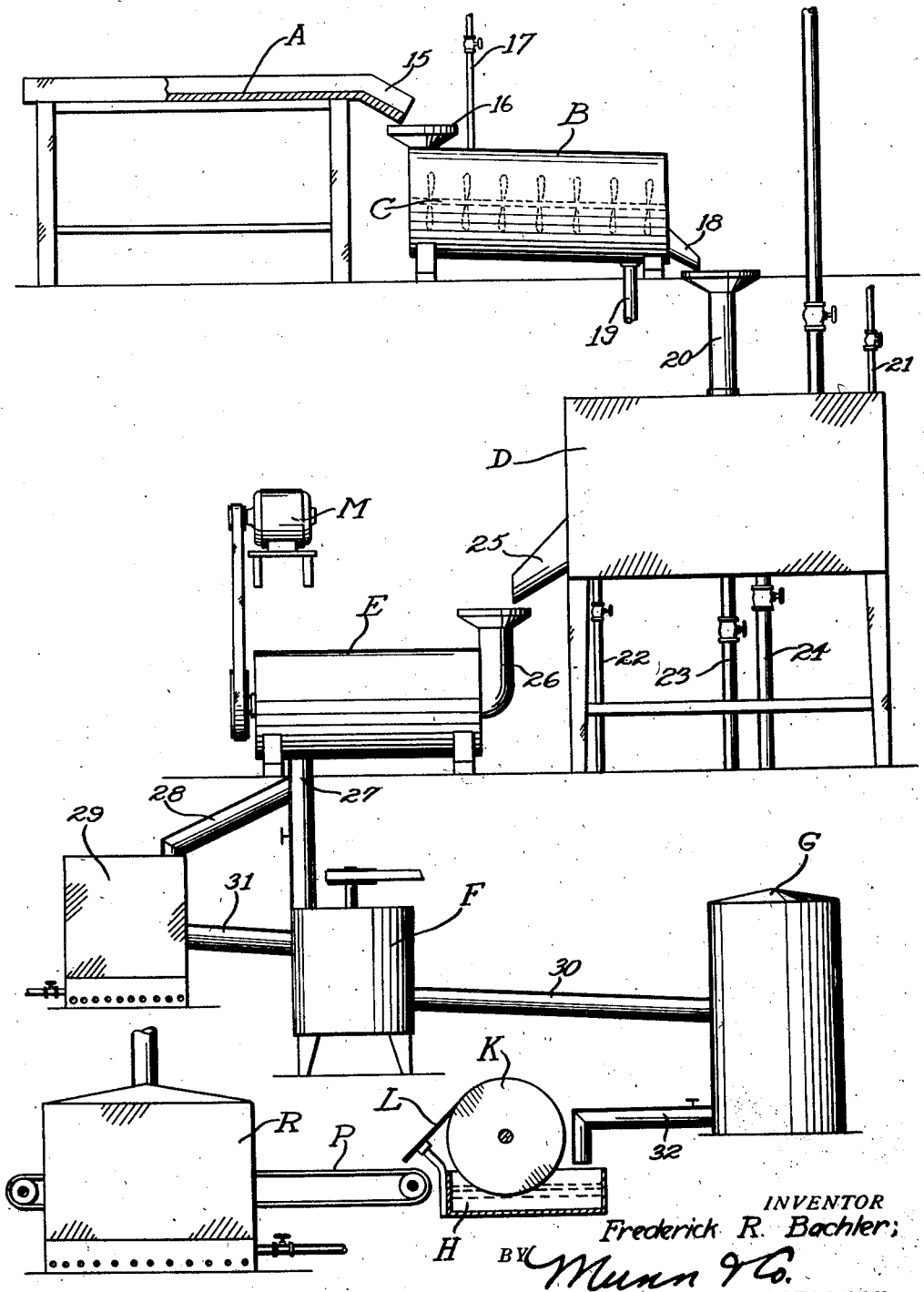
INVENTOR
Frederick R. Bachler;
BY Munn & Co.
ATTORNEY

Patented July 7, 1931

1,813,268

UNITED STATES PATENT OFFICE

FREDERICK R. BACHLER, OF OXNARD, CALIFORNIA

PROCESS OF MAKING LEGUMINOUS FLAKES

Application filed August 1, 1927. Serial No. 209,970.

My invention relates to, and has for its purpose, the provision of a flaked food product made from beans, peas, or any other leguminous substance, and a process of making the product. By means of my process beans or peas of any variety can be converted into highly palatable, baked flakes devoid of the undesirable tendency of legumes in general to cause flatulence and other digestive disturbances.

Corn or other cereal flakes consist almost wholly of carbohydrates, while the flakes produced by my process contain, besides a small percentage of carbohydrates, a greater percentage of proteins which lend to flakes of this nature a food value that is unsurpassed by any other similar product. Moreover, by virtue of a high percentage of alkaline ash contents, these flakes possess nutritive and physiological merits of a very high order. Though beans or peas cooked and otherwise prepared in the usual manner possess the same nutritive and physiological values as the flaked and baked product, it is a well known fact that their use as a regular part of the daily diet causes in many persons an extreme flatulence and other digestive disturbances of an unpleasant character which prevent them from freely availing themselves of this otherwise highly beneficial, nutritive and cheap food.

I will describe only one process of making leguminous flakes, and one form of apparatus by which the process is performed, each embodying my invention.

In the accompanying drawing is shown schematically one form of apparatus embodying my invention.

In carrying out my process the beans or peas or any other edible legumes, split or whole, are first freed of impurities and then washed. In order to facilitate picking, or the removing of the peas or beans from the hulls, a table A is provided, and one end of this table, as indicated at 15, is for discharging the hulled peas or beans into the intake spout 16 of a washing tank B. Water is supplied to the tank by a pipe 17, and an agitator C is movable within the tank in order to effect the proper washing of the legumes and so as to feed the latter to a discharge spout 18, it being noted that the tank B is inclined to effect a gravitational feed. A pipe 19 leads from the bottom of the tank B so that water may be drawn from the tank in order to make room for the fresh water supplied to the tank. From the spout 18 the washed legumes are discharged into a spout 20 of a tank D, in which they are subjected to the following leaching operation:

Leaching

By means of a pipe 21, cold or lukewarm water is supplied to the tank D, with the latter only partly filled with beans so as to provide room for their increased volume due to swelling. The leaching is carried out in such a manner that a continuous stream of fresh water from the pipe 21 enters at the top of the tank, while a stream of equal volume is drawn from the bottom of the tank through a pipe 22, thus effecting a gradual renewal of the water in which the legumes are surrounded, and thereby greatly aiding in the removal of unpleasant-tasting compounds by a process that is similar to osmosis. Another noticeable change due to leaching is that of swelling and softening of the legumes, thereby aiding and greatly facilitating the subsequent steps in the process. The time necessary for leaching varies greatly and depends upon the age and the kind of legume under treatment, so that it may thus require from six to twenty-four hours and even longer in certain cases.

The object of leaching is that of extracting unpleasant-tasting compounds of the order of saponins, as well as other bodies that possess flavor, taste, and physiological properties of an unpleasant character.

Steaming

The leached beans or peas are now steamed for the purpose of expelling such a volatile and unpleasant odoriferous matter as was not removed by the process of leaching. Incidentally, a further swelling and softening of the legumes is brought about. The steam process is as follows:

The tank D is first drained free of water, and then, while the tank is left open at its top, low-pressure steam is admitted from the bottom through a pipe 23. The steam pressure need not exceed five pounds. During the steaming, the water of condensation is drained away by the pipe 22. The duration of the steaming will vary greatly, it depending upon the kind and quality of the legumes that are treated. In general the steaming may be completed within fifteen minutes.

Cooking

The steaming process having been completed, the tank D is now closed, top and bottom, and the cooking of its contents is effected by supplying thereto steam under pressure from a pipe 24. A steam pressure of twenty-five pounds will, as a rule, suffice, but higher or lower pressures can be employed, and such pressures, of course, will correspondingly influence the length of time necessary to finish the process of cooking. By cooking the legumes, complete disintegration thereof is effected, thus reducing them to a homogeneous cooked mass.

Blowing off

When the pressure cooking is completed, the pressure in the tank is gradually released. The escaping steam will be heavily charged with unpleasant smelling volatile matter, as is also the case with the cooked mass. In order to expel this matter it is necessary to continue passing steam into the tank and at the same time permit its rapid escape from the tank. As a rule, blowing off requires but a few minutes of time, and the cooked mass is thereafter ready for discharge through a spout 25 into a milling apparatus. The tank D is rinsed clean with water and is then ready for another cycle.

It is not essential that all the foregoing operations be carried out in the same vessel, but they may be carried out equally well in two vessels, one for the leaching operation and another for the steaming, cooking, and blowing-off operations.

Milling

The milling apparatus comprises a tank E containing a milling element operable by a motor M. The cooked mass discharged from the spout 25 is delivered to the tank E through a spout 26. By milling, the cooked mass is converted into one that is of a creamy consistency and is free of lumps, and is thereafter ready for the seasoning and sweetening operation.

Seasoning and sweetening

The creamed and completely homogeneous mass is now salted to taste and is then sweetened. The operation of sweetening can be carried out by the addition of sugar or glucose, or both together, in solid form or in solution. Sweetness may also be developed in the beans or peas by the conversion of a certain proportion of the starch naturally occurring in the legumes into glucose by means of the well known process of acid hydrolysis and by means of cooking the mass under pressure. This sweetening process may be practiced as follows:

A portion of the unsalted creamed mass is transferred through pipes 27 and 28 into a pressure cooker 29. A suitable amount of hydrochloric acid is added and the mixture is cooked under pressure until a satisfactory saccharification takes places. The acid is then neutralized with sodium hydroxide, thus causing the formation of sodium chloride, the quantity of which may be sufficient to make unnecessary a special seasoning with salt of the rest of the creamed legumes. This process, while not new as to its chemistry, is new as far as I know, as to its application in the preparation of leguminous flakes or cereal flakes.

When the sugar and salt are added directly to the mass, the mass may be discharged from the mill E into a mixing tank F where the seasoning ingredients are thoroughly mixed with the material. From this mixer the seasoned material may be delivered to a storage tank G through a pipe 30. When the conversion process is employed for seasoning, the treated portion of the creamed mass is delivered through a pipe 31 to the mixing tank where it is mixed with the remainder of the mass, and the mass is finally delivered to the storage tank G.

Flaking

This step consists in transferring the creamed and seasoned mass from the tank G to a feed tank H through a pipe 32. Rotating within the tank H is a rotary drum drier K which consists of one or more large slowly rotating steam-heated cylindrical drums. The positioning of the drum is such that it dips at the lowest point of its circumference into the creamed mass in the tank H. During the rotational movement of the drum a portion of the mass, without being subjected to pressure clings as a film to the surface of the drum and is thus elevated free of the tank. As the drum is heated, this batter dries into flakes which are continually scraped off by a scraping element L. The flakes, as removed from the drum, are discharged onto a conveyor belt P and are thus conveyed into an oven R.

This method of flaking greatly differs from that of manufacturing cereal flakes by pressing or crushing the soaked and softened cereal between rollers. When flakes are produced in accordance with the pressing or crushing method, it will result in compactness of the flakes, and, if such a method should be applied for the purpose of flaking legumes, it will also result in the pressing out from the creamed mass a large portion of the protein and the alkaline elements, as well as carbohydrates and other alimental constituents, thus causing a considerable reduction of the nutritive value of the legumes, so that the use of the flakes as a food product would be questionable. On the contrary, when the flaking of the legumes is performed according to my method, pressing or crushing of the creamed mass and of the flakes is avoided, so that the flakes will be light in texture and consequently will be easy to chew and to digest, and that a maximum of the desirable alimental constituents of the legumes retained in the creamed mass will also be retained in the flakes, thus making the flakes better fit for food than leguminous flakes produced by other methods hitherto known in the art.

*Baking*

The flakes, as delivered to the oven R, are baked by the application of heat thereto and are thus rendered crisp. Thus, the final product is in the form of leguminous flakes properly seasoned and sweetened, if so desired, and these flakes are devoid of the undesirable characteristics which render legumes so difficult to digest, while at the same time all the nutritive characteristics of the legumes are preserved.

Although I have herein shown and described only one form of food product and one process of making the same, it is to be understood that various changes and modifications may be made herein.

I claim:

1. A process of making leguminous flakes which consists in extracting unpleasant-tasting compounds and bodies from legumes by leaching, in a stream of continuously changing cold or lukewarm water expelling odoriferous volatile matter from the leached legumes by steaming, cooking, and disintegrating the legumes by subjecting them to a pressure-cooking operation, circulating steam into and out of the vessel containing the disintegrated and cooked mass so as to discharge odoriferous and volatile matter therefrom, converting the cooked mass into one of a creamy consistency by homogenizing, seasoning the creamed mass by treating a portion thereof so as to convert a portion of its starch content into glucose and to produce sodium chloride therein, mixing the treated portion with the remainder of the mass, causing the mass to adhere as a film upon a heated surface, without exerting a pressure upon the mass, scraping off the film from the heated surface and thereby producing flakes of a light texture, and finally baking the flakes.

2. A process of making leguminous flakes which consists in extracting unpleasant-tasting compounds and bodies from legumes through the medium of osmosis, expelling odoriferous volatile matter, cooking and disintegrating the legumes so as to reduce them to a cooked mass, expelling odoriferous volatile matter from the cooked mass, converting the cooked mass into one that is of a creamy consistency and is free of lumps, seasoning the mass, causing the mass to adhere as a film upon a heated surface, without exerting a pressure upon the mass, removing the film from the heated surface so as to produce flakes of a light texture, and finally baking the flakes.

3. The process of making leguminous flakes which consists in extracting unpleasant-tasting compounds and bodies from legumes through the medium of osmosis, expelling odoriferous volatile matter, cooking and disintegrating the legumes so as to reduce them to a cooked mass, expelling odoriferous volatile matter from the cooked mass, converting the cooked mass into one that is of a creamy consistency and is free of lumps, causing the mass to adhere as a film upon a heated surface, without exerting a pressure upon the mass so as to produce flakes of a light texture, and finally baking the flakes.

4. A process of making leguminous flakes which consists in extracting unpleasant-tasting compounds and bodies from legumes by leaching in a stream of continuously changing cold or lukewarm water, expelling odoriferous volatile matter from the leached legumes by steaming, cooking, and disintegrating the legumes by subjecting them to a pressure-cooking operation, circulating steam into and out of the vessel containing the disintegrated and cooked mass so as to discharge odoriferous and volatile matter therefrom, converting the cooked mass into one of a creamy consistency by homogenizing seasoning the creamed mass, causing the mass to adhere as a film upon a heated surface, without exerting a pressure upon the mass, removing the film from the heated surface so as to produce flakes of a light texture, and finally baking the flakes.

FREDERICK R. BACHLER.